United States Patent [19]

Möller

[11] Patent Number: 5,118,169

[45] Date of Patent: Jun. 2, 1992

[54] CONTROL VALVE DEVICE

[75] Inventor: Johannes Möller, Hemmingen, Fed. Rep. of Germany

[73] Assignee: WABCO Westinghouse Fahrzeugbremsen GmbH, Hanover, Fed. Rep. of Germany

[21] Appl. No.: 517,455

[22] Filed: Apr. 30, 1990

Related U.S. Application Data

[63] Continuation of Ser. No. 234,851, Aug. 22, 1988, abandoned.

[30] Foreign Application Priority Data

Aug. 26, 1987 [DE] Fed. Rep. of Germany ....... 3728463

[51] Int. Cl.$^5$ ............................................. B60T 8/36
[52] U.S. Cl. .................................... 303/118; 303/113 R
[58] Field of Search ................... 303/41, 56, 61, 68, 303/72, 113, 115, 118, 119, 113 R; 188/181 A, 152 R; 132/513.3, 513.5; 251/30.01, 30.02; 60/581

[56] References Cited

U.S. PATENT DOCUMENTS

| | | | |
|---|---|---|---|
| 572,464 | 12/1896 | Woods | 137/513.5 |
| 775,670 | 11/1904 | Cozzens | 137/513.3 |
| 3,110,527 | 11/1963 | Fox | 137/513.3 |
| 3,319,742 | 5/1967 | Cumming | 188/152 |
| 3,550,966 | 12/1970 | Leiber | 303/119 |
| 3,907,381 | 9/1975 | Bablitzka | 303/40 |
| 3,976,335 | 8/1976 | Sekiguchi | 303/113 |
| 4,580,849 | 4/1986 | Farr | 303/118 |
| 4,693,270 | 9/1987 | Yaindl | 137/513.3 X |
| 4,740,041 | 4/1988 | Pannbacker | 303/118 X |

FOREIGN PATENT DOCUMENTS

| | | |
|---|---|---|
| 1104363 | 4/1961 | Fed. Rep. of Germany . |
| 1188965 | 3/1965 | Fed. Rep. of Germany . |
| 1226895 | 10/1966 | Fed. Rep. of Germany . |
| 2146594 | 9/1971 | Fed. Rep. of Germany . |
| 1650571 | 11/1976 | Fed. Rep. of Germany . |
| 2829978 | 1/1979 | Fed. Rep. of Germany . |
| 2829290 | 1/1980 | Fed. Rep. of Germany . |
| 3002756 | 9/1980 | Fed. Rep. of Germany . |
| 2940059 | 4/1981 | Fed. Rep. of Germany . |
| 1569965 | 9/1981 | Fed. Rep. of Germany . |
| 3041247 | 6/1982 | Fed. Rep. of Germany . |
| 3345697 | 6/1985 | Fed. Rep. of Germany . |
| 3408123 | 9/1985 | Fed. Rep. of Germany . |
| 0518431 | 2/1940 | United Kingdom . |
| 1557347 | 12/1979 | United Kingdom . |

Primary Examiner—Matthew C. Graham
Attorney, Agent, or Firm—Horst M. Kasper

[57] ABSTRACT

A control valve device is provided for a pneumatically-operated vehicle brake system equipped with an antilocking device. The control valve has a controlled inlet valve and a controlled outlet valve. A pressure medium outlet chamber may be connected to a pressure medium inlet chamber by the inlet valve and to atmosphere by the outlet valve. The pressure medium inlet chamber is divided into a first sectional chamber connected to the inlet valve and a second sectional chamber connected to the pressure medium inlet. The first sectional chamber and the second sectional chamber can be connected through an additional valve device acting as a check valve which can be moved into an open position in a direction of the first sectional chamber. In this manner, it becomes possible to achieve a pressure reduction by not directing the reflux of the pressure medium from the pressure medium outlet chamber through the pressure medium inlet chamber, but instead through the outlet valve directly to atmosphere. This leads to an accelerated pressure reduction in the pressure medium outlet chamber and thus in the consumer.

30 Claims, 2 Drawing Sheets

CONTROL VALVE DEVICE

This application is a continuation of application Ser. No. 07/234,851, filed Aug. 22, 1988.

FIELD OF THE INVENTION

The present invention relates, in general, to control valve equipment and, more particularly, this invention relates to a control valve device for use in an antilocking mechanism of a pneumatically-operated vehicle brake system.

BACKGROUND OF THE INVENTION

Prior to the present invention, control valve devices of this general nature have been taught in the prior art. See, for example, German publication DE 33 45 697 A 1.

The control valve device shown and taught in DE 33 45 697 A1 includes a pressure medium inlet chamber which can be connected to a pressure medium source by a pressure medium inlet, and a pressure medium outlet chamber which is connected to a consumer, such as, the wheel brake cylinder of a vehicle.

The pressure medium outlet chamber can be connected on the one side to the pressure medium inlet chamber via a controlled inlet valve and, on the other side, to the atmosphere via an outlet valve. An actuating piston, which serves the purpose of actuating the outlet valve, limits the pressure medium outlet chamber with a first active surface, and a control chamber with a second active surface which is directed against the first active surface. The control chamber can be either connected to the atmosphere or to the pressure medium inlet chamber by a control valve.

The pressure in the pressure medium outlet chamber is applied to the actuating piston in an opening direction of the outlet valve, while the pressure in the control chamber is applied to the actuating piston in a closing direction of the outlet valve.

It is also conceivable not to connect the control valve to the pressure medium inlet chamber, but to connect it to a pressure medium supply line that communicates the pressure medium for the pressure medium inlet chamber, and connected to the pressure medium inlet of the control valve device, or to connect the control valve device to a pressure medium device connected before the pressure medium inlet and feeding into this pressure medium supply line.

The pressure is communicated to the consumer from a pressure medium source via a valve constructed as a combined inlet and outlet valve, such as a brake valve, and the opened inlet valve of the control valve device, while simultaneously, the pressure medium from the pressure medium inlet chamber, or the pressure medium in the pressure medium supply line connected to the pressure medium inlet, respectively, is applied to the control chamber associated with the outlet valve of the control valve device.

The pressure reduction in the consumer is, as well, achieved via the open inlet valve of the control valve device and the pressure medium inlet chamber, and the outlet valve of the combined inlet and outlet valve connected before the control valve device. The control chamber of the outlet valve of the control valve device is bled via the associated control valve, also via the pressure medium inlet chamber, or the pressure medium supply line feeding into the pressure medium inlet chamber.

Only if a regulated pressure reduction is desired in the consumer, the pressure in the consumer is decreased through the outlet valve of the control valve device by triggering the control valve associated with the outlet valve of the control valve device.

Thus, if a regulated pressure reduction is desired, the consumer is always bled through the inlet valve of the control valve device, the pressure medium inlet chamber, the pressure medium supply line running from the pressure medium inlet to the combined inlet and outlet valve, and through the outlet valve of the combined inlet and outlet valve.

The disadvantage of this control valve device, known to the art, is the fact that the process of bleeding the consumer requires a relatively long time period.

SUMMARY OF THE INVENTION

The present invention provides a control valve device that is particularly well suited for use in an antilocking device of pneumatically-operated vehicle brake systems. This control valve device includes a pressure medium inlet chamber, which can be connected to a pressure medium source through a pressure medium inlet. A pressure medium outlet chamber of the control valve device is connected to a consumer of fluid pressure The pressure medium outlet chamber can be connected to the pressure medium inlet chamber by a controlled inlet valve. The pressure medium outlet chamber can also be connected to atmosphere through an outlet valve. An actuator is provided for actuating the outlet valve. Pressure from a control chamber is applied to such actuator in the closing direction of the outlet valve. Such control chamber can be connected through a control valve to either the atmosphere or to the pressure medium inlet chamber. In the control valve device of the present invention, the pressure medium inlet chamber is divided into a first sectional chamber and a second sectional chamber. The first sectional chamber and the second sectional chamber can be connected through an additional valve device. The first sectional chamber is connected to the inlet valve, and the second sectional chamber is connected to the pressure medium inlet of the control valve device. The additional valve device is constructed like a check valve. In addition, such additional valve device can be moved into the open position in the direction of the first sectional chamber by the effect of the pressure present in the second sectional chamber.

OBJECTS OF THE INVENTION

It is, therefore, one of the primary objects of the present invention to provide a control valve device for use with an antilocking device of a pneumatically-operated brake system in which shorter bleeding times can be achieved, thereby providing improved operation of such brake system.

Another object of the present invention is to provide a control valve device for use with an antilocking device of a pneumatically-operated brake system in which, by simple means, it is possible to execute any bleeding process through an outlet valve of such control valve device.

Still another object of the present invention is to provide a control valve device for use with an antilocking device of a pneumatically-operated brake system in which an opening movement of the outlet valve of such control valve device can be accelerated.

In addition to the above-described objects and advantages of the control valve device for use in a pneumatically-operated brake system equipped with an antilocking device, various other objects and advantages of the present invention will become more readily apparent to those persons skilled in the pneumatic braking art, from the following much more detailed description of such control valve device, when such description is taken in conjunction with the attached drawings and the appended claims.

BRIEF DESCRIPTION OF THE INVENTION

Figure 1:
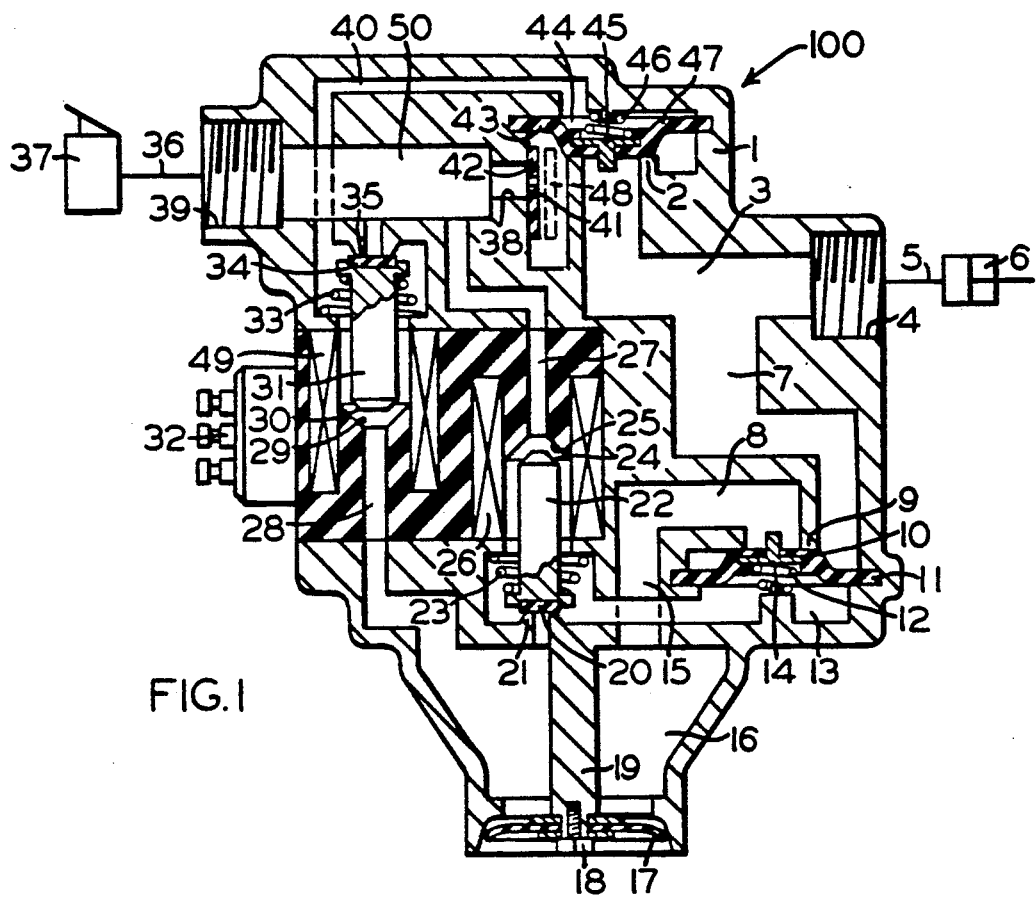
FIG. 1 is a side elevation view, partially in cross-section, which illustrates one presently preferred embodiment of the invention of a control valve device having a pressure medium inlet chamber constructed in two parts, and in which the first sectional chamber is connected to an inlet valve and is equipped with a one-way restrictor which can be moved into an open position in a direction of the first sectional chamber by the pressure in the second sectional chamber.

Prior to proceeding to the detailed description of the present invention, it should be noted that identical components have been identified with identical reference numerals throughout the drawing FIGURES.

Now, refer more particularly to FIG. 1 in which there is illustrated therein a control valve device, generally designated 100, for use with a pneumatically-operated vehicle braking system that is equipped with an antilocking device.

In a housing of the control valve device 100, a controlled inlet valve is provided. The controlled inlet valve includes a valve body member 47 and a valve seat 2 formed as a part of the housing 1. Also, in the housing 1 of the control valve device 100 is an outlet valve. The outlet valve consists of a valve body 10 and a valve seat 9. The valve seat 9, like the valve seat 2, is formed as a part of the housing 1.

The inlet valve 47, 2 is actuated by an actuator. Such actuator is constructed as a diaphragm 43 which is fastened within the housing adjacent the outer periphery thereof. The diaphragm 43 is equipped with a centrically-arranged metallic armor 45 which supports the valve body 47. The outlet valve 9, 10 can be actuated in the same manner by an actuator constructed as a diaphragm 11. The outer periphery of the diaphragm is also fastened inside the housing 1 and has a metallic armor 14 arranged centrically and supporting the valve body 10.

With its first active surface facing the inlet valve 47, 2, the diaphragm 43 limits a pressure medium inlet chamber 48, 50, while with its second active surface facing away from the pressure medium inlet chamber 48, 50, it limits a control chamber 44. The pressure medium inlet chamber 48, 50 is divided into a first sectional chamber 48 and a second sectional chamber 50. A passage 38 is provided in the wall of the housing 1, which separates the first sectional chamber 48 from the second sectional chamber 50. The passage 38 connects the first sectional chamber 48 with the second sectional chamber 50. The first sectional chamber 48 is connected to the inlet valve 47, 2, while the second sectional chamber 50 is connected to a pressure medium inlet 39.

A spring 46, supported by a housing wall limiting the control chamber 44, acts on the diaphragm 43 in the closing direction of the inlet valve 47, 2.

In the same manner, the diaphragm 11, associated with the outlet valve 9, 10, with its first active surface facing the valve body 10 of the outlet valve 9, 10, limits a pressure medium outlet chamber 3, 7, while with its active surface facing away from the pressure medium outlet chamber 3, 7, it limits a control chamber 13. A spring 12, supported by a housing wall limiting the control chamber 13, acts on the diaphragm 11 in the closing direction of the outlet valve 9, 10.

By way of the pressure medium inlet 39, which is located above the housing 1, and the pressure medium supply line 36 connected to the pressure medium inlet, the second sectional chamber 50 of the pressure medium inlet chamber 48, 50 can be connected to a combined inlet and outlet valve that is constructed as a brake valve 37. Such brake valve 37 which, in turn, is connected to a pressure medium source. The pressure medium outlet chamber 3, 7 is connected to a consumer that is constructed as a brake cylinder 6 by a pressure medium outlet 4 and a pressure medium supply line 5.

A chamber 8 in the housing which can be sealed against the pressure medium outlet chamber 3, 7 by the outlet valve 9, 10, is connected to a bleeding space 16 leading to the atmosphere through a channel 15 provided in the housing The bleeding space 16 contains a centrically-installed finger 19 with an elastic flap 17 covering the bleeding space 16. The finger 19, with the elastic flap 17, is fastened to the free front face of the finger 19 by means of a screw 18, and such elastic flap 17 can be moved into an open position in a direction of the atmosphere.

Two electromagnetic valves, which serve as control valves for the inlet valve 47, 2 and the outlet valve 9, 10, are located in a cavity of the housing 1.

The first control valve for the inlet valve 47, 2 of the control valve device 100 comprises a coil 49, a guide tube for the armature, which is placed centrically within the coil 49 and parallel to the longitudinal axis of the coil 49, as well as an armature 31 which, within the guide tube for the armature, can be moved against the force of a spring 33 and which has on valve body 34 and 30 at each of its opposing front sides. One of the valve bodies 34 joins with a first valve seat 35, formed as a part of the housing 1, to form an inlet valve 34, 35; while the other valve body 30 joins with a second valve seat 29, also formed as a part of the housing 1, to form an outlet valve 29, 30.

The second control valve for the outlet valve 9, 10 of the control valve device 100, as well, consists of a coil 26, a guide tube for the armature, as well as an armature 22 which, in the guide tube for the armature 22, can be moved against the force of a spring 23 and which has one valve body 24 and 20 at each of its opposing front sides. One of the valve bodies 24 joins with a first valve seat 25, formed as a part of the housing 1, to form an inlet valve 24, 25; while the other valve body 20 joins with a second valve seat 21, also formed as a part of the housing 1, to form an outlet valve 20, 21.

The control chamber 44 for the inlet valve 47, 2 of the control valve device 100 is connected to the first control valve via a channel 40 that is located in the housing 1. A channel 28 connects the bleeding space 16, as well, with the first control valve.

Through the second control valve, which is associated with the control chamber 13 for the outlet valve 9, 10 of the control valve device 100, the control chamber 13 can be connected either to the atmosphere or, via a channel 27, to the second sectional chamber 50 of the pressure medium inlet chamber 48, 50.

The first sectional chamber 48 of the pressure medium inlet chamber 48, 50 is provided with an additional valve device constructed as a check valve. The check valve consists of a flap-like valve body 42, preferably constructed as a diaphragm, with a throttle port 41. The valve body 42 is constructed and positioned in such a way that it combines with the side of the passage 38, connecting the first sectional chamber 48 with the second sectional chamber 50, which faces the first sectional chamber 48 of the pressure medium inlet chamber 48, 50 to form a one-way restrictor 38, 42, 41, which can be moved into an open position in the direction of the first sectional chamber 48.

The one-way restrictor 38, 42, 41 can be constructed in different ways and may be installed in the area of the first sectional chamber 48. It may, for example, consist of an elastic, flap-like part vulcanized to the diaphragm 43 of the inlet valve 47, 2. It is, as well, possible to construct the one-way restrictor 38, 42, 41 as a body which is spring-loaded in the direction of the second sectional chamber 50, such as, a sphere or a plate equipped with a throttling port and dimensioned in such a way that the passage 38 can be closed by this spring-loaded body.

The electromagnetic valves, which serve as control valves, are triggered by electrical circuits 32.

The function of the control valve device 100, described above, will now be explained below in more detail.

During a braking process, pressure medium is communicated from the brake valve 37 through the pressure medium supply line 36 and the pressure medium inlet 39 into the second sectional chamber 50 of the pressure medium inlet chamber 48, 50. The one-way restrictor 38, 42, 41 is moved into an open position by the effect of the pressure in the second sectional chamber 50. The pressure medium reaches the first sectional chamber 48 of the pressure medium inlet chamber 48, 50 through the opened one-way restrictor 38, 42, 41. Simultaneously, pressure medium acting as control pressure reaches the control chamber 13 of the outlet valve 9, 10 of the control valve device 100 through the channel 27, which serves as a control supply line, and the inlet valve 24, 25 of the second control valve which is in an open position. The outlet valve 20, 21 of the second control valve is in a closed position.

The inlet valve 34, 35 of the first control valve is in a closed position while the outlet valve 29, 30 of the same control valve is in an open position.

The pressure that is building up within the pressure medium inlet chamber 48, 50 loads the diaphragm 43 of the inlet valve 47, 2 against the force of the spring 46 in the opening direction of the inlet valve 47, 2 and thus moves the inlet valve 47, 2 into an open position. Now, the pressure medium flows from the pressure medium inlet chamber 48, 50 through the open inlet valve 47, 2 into the pressure medium outlet chamber 3, 7, and from here, through the pressure medium outlet 4 and the pressure medium supply line 5, which is connected to the pressure medium outlet 4 into the brake cylinder 6.

The pressure in the pressure medium outlet chamber 3, 7, loads the diaphragm 11 of the outlet valve 9, 10 in the opening direction of the outlet valve 9, 10. Since the elevation of the control pressure that is building up in the control chamber 13 of the outlet valve 9, 10 is substantially equal to the consumer pressure that is building up in the control chamber 13 of the outlet valve 9, while on the other hand, the active surface of the diaphragm 11, which faces the control chamber 13, is larger than the active surface of the diaphragm 11 which faces the pressure medium outlet chamber 3, 7, the outlet valve 9, 10 remains in the closed position.

If for the purpose of bleeding the operating chamber of the brake cylinder 6, the brake valve 37 is switched, the pressure medium supply line 36 and the pressure medium inlet 39 connected to it, as well as the second sectional chamber 50 of the control valve device 100, are bled via the outlet valve of the brake valve 37 into the atmosphere.

Since during this process a pressure difference forms between the pressure in the second sectional chamber 50 and the pressure in the first sectional chamber 48 of the pressure medium inlet chamber 48, 50, the one-way restrictor 38, 42, 41 is moved into a closed position. The control pressure medium flows from the control chamber 13 of the outlet valve 9, 10 of the control valve device 100, through the open inlet valve 24, 25, into the second sectional chamber 50, and continues from there through the pressure medium inlet 39 and the pressure medium supply line 36, as well as the brake valve 37, into the atmosphere.

Due to the pressure difference forming during this process between the control pressure that is building up in the control chamber 13 and the consumer pressure present in the pressure medium outlet chamber 3, 7, the diaphragm 11 of the outlet valve 9, 10 is moved in the direction of the control chamber 13 by the consumer pressure present in the pressure medium outlet chamber 3, 7, and thus the outlet valve 9, 10 is moved into the open position.

The operating chamber of the brake cylinder 6 is bled through the pressure medium outlet chamber 3, 7, the opened outlet valve 9, 10, as well as through the chamber 8, and the channel 15 which leads to the bleeding space 16, and can be connected to the atmosphere by the check valve 17.

Since the check valve located between the first sectional chamber 48 and the second sectional chamber 50 of the pressure medium inlet chamber 48, 50 is constructed as a one-way restrictor, the pressure medium also is reduced by a small amount in the brake cylinder 6 through the opened inlet valve 47, 2 and the pressure medium inlet chamber 48, 50, as well as through the throttling port 41 located in the one-way restrictor 38, 42, 41 toward the atmosphere. Due to the presence of the throttling port 41 in the one-way restrictor 38, 42, 41, the process of brake releasing can be effectively stepped.

Once the pressure in the brake cylinder 6, along with the pressure in the pressure medium outlet chamber 3, 7, and in the pressure medium inlet chamber 48, 50 has been reduced sufficiently that it approximates the value of the atmospheric pressure, the outlet valve 9, 10 is moved into the closing position by the force of the spring 12. In the same manner, the inlet valve 47, 2 is moved into the closed position by the force of the spring 46.

If during a braking process the pressure in the brake cylinder 6 is to be regulated, this occurs in the manner that is well known to the art by triggering the control valves which are constructed as electromagnetic valves.

For the purpose of holding the pressure in the brake cylinder 6, for example, the first control valve which is associated with the control chamber 44 of the inlet valve 47, 2 is triggered, the inlet valve 34, 35 of the first control valve is moved into the open position and the outlet valve 29, 30 of the control valve is moved into the closed position, while control pressure medium is communicated through the channel 40 into the control chamber 44 of the inlet valve 47, 2. The control pressure building up in the control chamber 44 causes a movement of the diaphragm 43 in the direction of the pressure medium inlet chambers 48, 50, which leads to closure of the inlet valve 47, 2.

If a regulated pressure reduction is desired in the brake cylinder 6, the second control valve, which is associated with the outlet valve 9, 10 and is constructed as an electromagnetic valve, is triggered in such a way that the inlet valve 23, 25 of this control valve moves into a closed position while the outlet valve 20, 21 of the control valve is simultaneously opened. The control pressure present in the control chamber 13 of the outlet valve 9, 10 is reduced toward the atmosphere via the opened outlet valve 20, 21 of the second control valve and the bleeding space 16. The resulting pressure difference between the pressure in the control chamber 13 and the pressure in the pressure medium outlet chamber 3, 7 causes the outlet valve 9, 10 of the control valve device to open.

Figure 2:
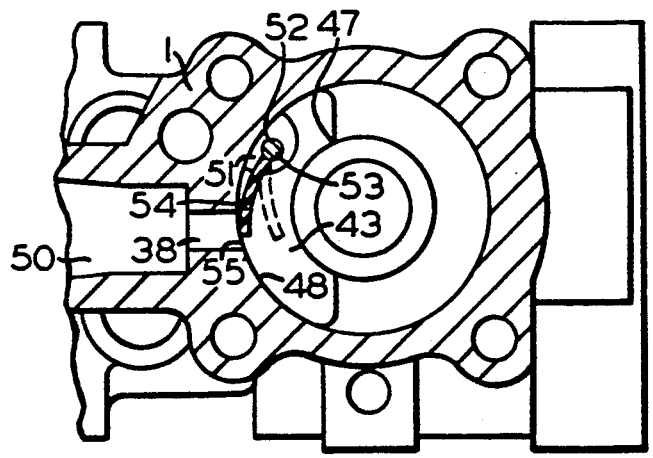
FIG. 2 is a side elevation view, partially in cross-section, which illustrates the first sectional chamber and the second sectional chamber of the pressure medium chamber of the control valve device of the present invention, in which the first sectional chamber is equipped, in its interior, with a flap-like valve body of a one-way restrictor which pivots around a pin.

Now, refer more particularly to FIG. 2 which shows schematically the pressure medium inlet chamber 48, 50, the pressure medium outlet, and the diaphragm 43 of the inlet valve of the control valve device 100, as well as the one-way restrictor located in the first section chamber 48.

As mentioned above, for the sake of clarity, the components are marked with the same symbols as the corresponding components in FIG. 1.

FIG. 2 shows the diaphragm 43 fastened within the housing 1 of the control valve device 100 and separating the first sectional chamber 48 of the pressure medium inlet chamber 48, 50 from the control chamber of the inlet valve. The diaphragm 43 supports the valve body 47, which combines with a housing-firm valve seat to form the inlet valve of the control valve device 100, while the pressure medium inlet chamber 48, 50 can be connected to the pressure medium outlet chamber and the pressure medium connected after it through this inlet valve of the control valve device 100.

The pressure medium inlet chamber 48, 50 is linked to the pressure medium inlet, which is connected after it, and which is connected to the brake valve 37. The wall which divides the pressure medium inlet chamber 48, 50 into the two sectional chambers 48, 50, and which is penetrated by the passage 38, is provided with a nose-like formation protruding into the first sectional chamber 48 of the pressure medium inlet chamber 48, 50, and having a cavity for receiving a pin 53. The pin 53 serves as a mount for a flap-like, preferably elastic body 54 which, when slightly pretensioned, rests against one part of the wall of the pressure medium inlet chamber 48, 50, which separates the first sectional chamber 48 from the second sectional chamber 50.

The flap-like body 54 is placed and dimensioned in such a way that it covers the largest part of the cross-section of the passageway 38. A narrow gap limited by the free end of the flap-like body 54 and a portion of the wall separating the first sectional chamber 48 from the second sectional chamber 50 serve as a throttling port 55 for the one-way restrictor 38, 42, 41, which is formed by the flap-like body 54 and the passage 38, and can be moved into the open position in the direction of the first sectional chamber 48 of the pressure medium inlet chamber 48, 50.

Figure 3:
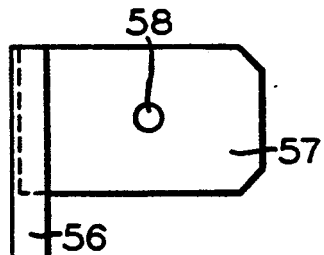
FIG. 3 is a plan view which illustrates a flap-like valve body with a throttle port which can be used in the control valve device of the present invention.
Figure 4:
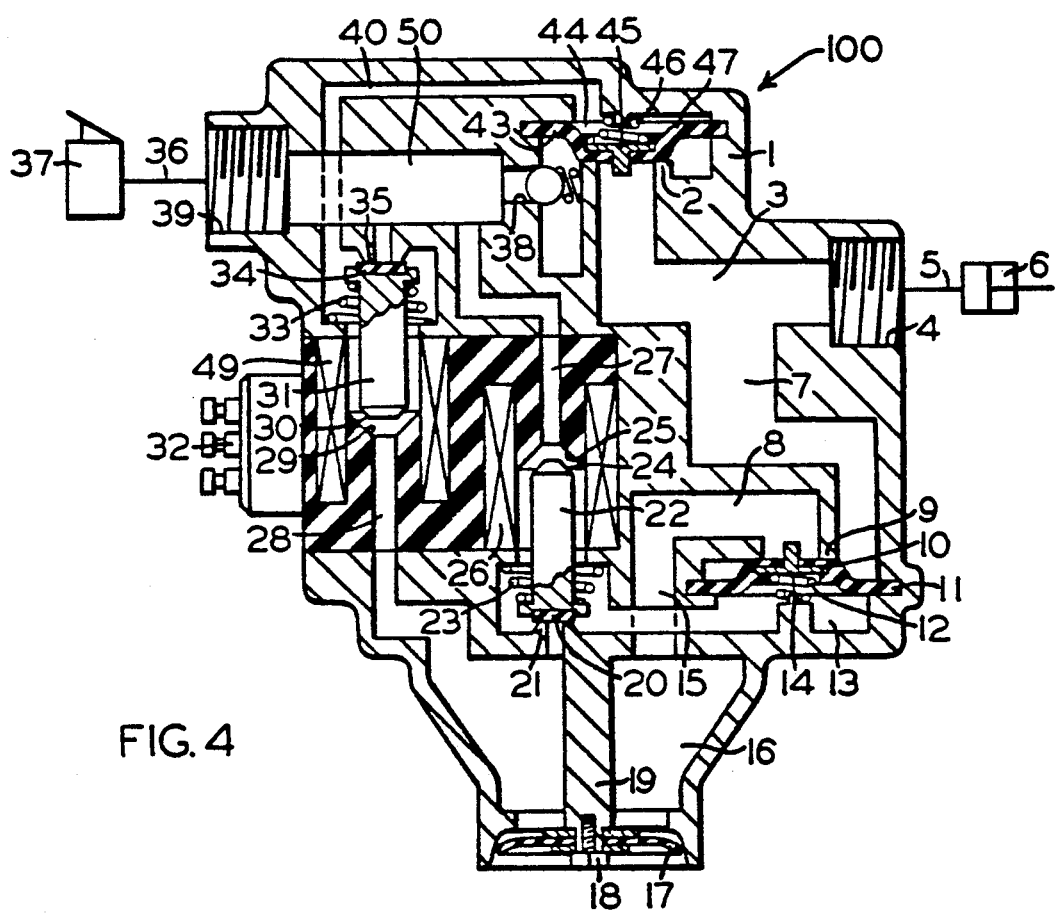
FIG. 4 shows an embodiment with a ball check valve.

Now, refer to FIG. 3 with regard to the position of the reflux flap for a one-way restrictor, which shows the same construction as shown in FIG. 2 with the position of the flap-like body which combines with the peripheral area of the passage facing the first sectional chamber 48 of the pressure medium inlet chamber 48, 50 of the control valve device 100 to form a check valve.

The reflux flap, according to FIG. 3, is fastened to a pin 56 which is held in a hole bored into the pressure medium inlet chamber 48, 50 of the control valve device 100. The reflux flap 57 preferably consists of an elastic material and is dimensioned and located in such a way that it rests against a portion of the wall limiting the first sectional chamber 48 of the pressure medium inlet chamber 48, 50 and covers the entire cross-section of the passage in the housing of the control valve device 100, which connects the first sectional chamber 48 with the second sectional chamber 50, and in this manner a check valve is formed.

A passage 58 located in the reflux flap 57 represents a throttling port which, when the check valve is closed, allows a throttled flow of pressure medium from the first sectional chamber 48 of the pressure medium inlet chamber 48, 50 toward the second sectional chamber 50 of the pressure medium inlet chamber 48, 50, and then through the pressure medium inlet to the brake valve 37 and through the brake valve 37 into the atmosphere.

It is, of course, also possible to construct the additional valve device as a simple check valve and not, as described above, as a one-way restrictor. If a simple check valve of this kind were to be used, the outlet valve of the control valve device 100 would open abruptly during the bleeding process for the consumer (the brake cylinder, for example).

If a trip line which is not connected to the pressure medium inlet chamber of the control valve device 100 leads to the control valve for the outlet valve, the check valve or the one-way restrictor may be located either in the pressure medium inlet or in the pressure medium supply line leading from the brake valve to the pressure medium inlet.

It is, of course, also conceivable not to connect the control valve associated with the outlet valve of the control valve device 100 with the pressure medium inlet chamber, but with a pressure medium supply line feeding into the pressure medium inlet chamber, or to a device feeding into such pressure medium supply line; in which case, the additional valve device is connected before the pressure medium inlet chamber and the control valve is connected to the part of the pressure medium supply line which is connected before the additional valve device, or to the device feeding into such pressure medium supply line. The additional valve device, in this case, can be moved into an open position by the effect of the pressure present in the pressure medium supply line feeding into the pressure medium inlet chamber.

In this case, as well, pressure corresponding to the pressure in the control chamber is applied through the control valve to the control chamber associated with the outlet valve.

It can be seen from the above description of the control valve device that the present invention, in particular, has the advantage that it provides a control valve device in which it is possible, by simple means, to execute any bleeding process through the outlet valve of the control valve device 100, regardless of whether a regulated pressure reduction caused by the control valve associated with the outlet valve of the control valve device occurs in the consumer, or whether only a non-regulated pressure reduction, caused by bleeding the pressure medium supply line running from the combined inlet and outlet valve to the control valve device, occurs in the consumer. Due to the fact that the pressure medium outlet chamber of the control valve device is not bled through the pressure medium inlet of the control valve device during a bleeding process effected by the combined inlet and outlet valve connected before the control valve device and constructed as, for example, a brake valve, a great pressure force is applied in the opening direction of the outlet valve to the diaphragm of the outlet valve while bleeding the control chamber associated with the outlet valve. In this manner the opening movement of the outlet valve is accelerated.

The shortest way for reducing pressure in the consumer is the path through the outlet valve of the control valve device to the atmosphere In accordance with an advantageous embodiment of the invention, described above, a first sectional chamber of the pressure medium inlet chamber of the control valve device, which is connected to the inlet valve, is provided with an additional valve, constructed as a one-way restrictor, which allows the smooth transfer of the pressure medium from a second sectional chamber of the pressure medium inlet chamber into the first sectional chamber, connected to the inlet valve, while admitting only a restricted reverse flow of the pressure medium while bleeding from the first sectional chamber towards the second sectional chamber, which is connected to the pressure medium inlet.

While a number of presently preferred embodiments of the control valve device for use in a pneumatically-operated braking system equipped with an antilocking device have been described in detail above, it should be obvious to those persons skilled in the pneumatic braking art that various other modifications and adaptations of the present invention can be made without departing from the spirit and scope of the appended claims.

I claim:

1. A control valve device for pneumatically-operated vehicle braking systems equipped with an antilocking device, said control valve device comprising:
    (a) a housing member;
    (b) a pressure medium inlet chamber positioned within said housing member and connectable to a source of pressure medium through a pressure medium inlet, said pressure medium inlet chamber being divided into a first sectional chamber and a second sectional chamber;
    (c) a pressure medium outlet chamber positioned within said housing member and connectable to a consumer of such pressure medium through a pressure medium outlet;
    (d) a controlled inlet valve disposed within said housing member intermediate said first sectional chamber of said pressure medium inlet chamber and said pressure medium outlet chamber to control communication of such pressure medium therebetween;
    (e) an outlet valve positioned within said housing member intermediate said pressure medium outlet chamber and an opening in said housing member capable of communicating such pressure medium to atmosphere;
    (f) an actuation piston disposed within said housing member in a position to engage said outlet valve for actuating said outlet valve;
    (g) a control chamber disposed in said housing member adjacent said actuating piston to enable fluid pressure application to said actuating piston in a closing direction of said outlet valve; and
    (h) a control valve disposed within said housing member to connect said control chamber to one of atmosphere and said second sectional chamber of said pressure medium inlet chamber;
   wherein said control valve device further includes an additional valve device in series with a controlled inlet valve and positioned within said housing member intermediate said first sectional chamber and said second sectional chamber of said pressure medium inlet chamber to control communication of such pressure medium therebetween, said additional valve device being movable to an open position in a direction of said first sectional chamber by an effect of pressure present in said second sectional chamber.

2. A control valve device, according to claim 1, wherein said additional valve device is constructed as a one-way restrictor.

3. A control valve device, according to claim 1, wherein said additional valve device is assembled into said control valve device as a check valve.

4. A control valve device, according to claim 3, wherein said check valve is constructed as a spring-loaded valve body which is mounted on a valve seat limiting a passage formed in a housing wall dividing said pneumatic pressure medium inlet chamber into said first sectional chamber and said second sectional chamber.

5. A control valve device, according to claim 3, wherein said check valve consists of a flap-like valve body positioned in said first sectional chamber in an area of a passage located in a housing wall dividing said pneumatic pressure medium inlet chamber of said control valve device into said first sectional chamber and said second sectional chamber.

6. A control valve device, according to claim 5, wherein said actuating piston consists of a diaphragm secured within said housing member of said control valve device to activate said controlled inlet valve.

7. A control valve device, according to claim 6, wherein a portion of an outer periphery of said diaphragm is secured to said housing member adjacent said passage in said housing wall which connects said first sectional chamber for pneumatic pressure communication with said second sectional chamber.

8. A control valve device, according to claim 7, wherein said valve body of said check valve has one end attached to a portion of a mounting member for said diaphragm.

9. A control valve device, according to claim 8, wherein said valve body of said check valve comprises a flap, and is dimensioned in a manner such that it combines with a portion of a peripheral area of said passage which faces said first sectional chamber to form said check valve.

10. A control valve device, according to claim 9, wherein one end of said flap is attached to a pin located within said first sectional chamber within said housing member.

11. A control valve device, according to claim 10, wherein said flap is dimensioned such that it covers a substantial portion of a cross-section of said passage formed in said housing wall.

12. A control valve device, said control valve device comprising:
 (a) a housing member;
 (b) a pressure medium inlet chamber positioned within said housing member and connectable to a source of pressure medium through a pressure medium inlet;
 (c) a pressure medium outlet chamber positioned within said housing and connectable to at least one of a consumer of such pressure medium and to atmosphere and to said pressure medium inlet chamber;
 (d) an additional valve device connected before said pressure medium inlet chamber, said additional valve device being movable into an open position in a direction of said pressure medium inlet chamber by an effect of a pressure present in a pressure medium supply line communicating into said pressure medium inlet chamber; and
 (e) a control valve connected to at least one of a portion of said pressure medium supply line that is connected in front of said additional valve device and a device feeding into said pressure medium supply line;
wherein said additional valve consists of a flap-like valve body positioned in said first sectional chamber in an area of a passage located in a housing wall dividing said fluid pressure medium inlet chamber of said control valve device into said first sectional chamber and said second sectional chamber.

13. A control valve device, according to claim 12, wherein said additional valve device is a one-way restrictor.

14. A control valve device, according to claim 12, wherein said fluid pressure medium outlet chamber is connected to atmosphere through an outlet valve.

15. A control valve device, according to claim 14, wherein said control valve device further includes an actuator positioned within said housing member to actuate said outlet valve.

16. A control valve device, according to claim 15, wherein fluid pressure from said fluid pressure medium outlet chamber is applied to said actuator in an opening direction of said outlet valve.

17. A control valve device, according to claim 16, wherein fluid pressure from a control chamber positioned within said housing member is applied to said actuator in a closing direction of said outlet valve.

18. A control valve device, according to claim 17, wherein said control chamber is connected to one of atmosphere through a control valve and a fluid pressure corresponding to a fluid pressure in said fluid pressure medium supply line feeding into said fluid pressure medium inlet chamber.

19. A control valve device, according to claim 12, wherein said actuator consists of a diaphragm secured within said housing member of said control valve device to activate said controlled inlet valve.

20. A control valve device, according to claim 19, wherein a portion of an outer periphery of said diaphragm is secured to said housing member adjacent said passage in said housing wall which connects said first sectional chamber for fluid pressure communication with said second sectional chamber.

21. A control valve device, according to claim 21, wherein said valve body comprises a check valve having a flap has one end attached to a portion of a mounting member for said diaphragm.

22. A control valve device, according to claim 21, wherein one end of said flap is attached to a pin located within said first sectional chamber within said housing member.

23. A control valve device, according to claim 20, wherein said valve body comprises a check valve having a flap is dimensioned in a manner such that it combines with a portion of a peripheral area of said passage which faces said first sectional chamber to form said check valve.

24. A control valve device, according to claim 23, wherein said flap is dimensioned such that it covers a substantial portion of a cross-section of said passage formed in said housing wall.

25. A control valve device, according to claim 12, wherein said additional valve device is a check valve.

26. A control valve device, according to claim 25, wherein said check valve is constructed as a spring-loaded valve body which is mounted on a valve seat limiting a passage formed in a housing wall dividing said fluid pressure medium inlet chamber into said first sectional chamber and said second sectional chamber.

27. Automatic control valve device, in particular for anti-skid lock devices of compressed air actuated vehicle braking systems comprising:
 (a) a pressure means input chamber is furnished, which is connectable via a pressure means input to a pressure means source;
 (b) a pressure means output chamber is furnished, and is connected to a user load;
 (c) a pressure means output chamber is connectable via a controllable input valve to the pressure means input chamber;
 (d) a pressure means output chamber is connectable to the atmosphere via an output valve;
 (e) an actuation piston is furnished for actuating of the output valve;
 (f) the actuation piston is subjected to the pressure in a control chamber in the closure direction of the output valve;
 (g) the control chamber is connectable selectively via a control valve to the atmosphere or to the pressure means input chamber;
characterized by the following features;
 (h) the pressure means input chamber is subdivided into a first partial chamber and a second partial chamber;
 (i) the first partial chamber and the second partial chamber are connectable to each other via an additional valve device;
 (j) the first partial chamber is connected to the input valve;
 (k) the second partial chamber is connected to the pressure means input of the automatic control valve device;

(l) the control valve is connected to the second partial chamber;

(m) the additional valve device performs the function of a check valve;

(n) the additional valve device operable to move into an open position in the direction of the first partial chamber being subjected to the pressure in the second partial chamber.

28. A control valve device for pneumatically-operated vehicle braking systems equipped with an antilocking device, said control valve device comprising:

(a) a housing member;

(b) a pressure medium inlet chamber positioned within said housing member and connectable to a source of pressure medium through a pressure medium inlet, said pressure medium inlet chamber being divided into a first sectional chamber and a second sectional chamber;

(c) a pressure medium outlet chamber positioned within said housing member and connectable to a consumer of such pressure medium through a pressure medium outlet;

(d) a controlled inlet valve disposed within said housing member intermediate said first sectional chamber of said pressure medium inlet chamber and said pressure medium outlet chamber to control communication of such pressure medium therebetween;

(e) an outlet valve positioned within said housing member intermediate said pressure medium outlet chamber and an opening in said housing member capable of communicating such pressure medium to atmosphere;

(f) an actuating piston disposed within said housing member in a position to engage said outlet valve for actuating said outlet valve;

(g) a control chamber disposed in said housing member adjacent said actuating piston to enable fluid pressure application to said actuating piston in a closing direction of said outlet valve; and (h) a control valve disposed within said housing member to connect said control chamber to one of atmosphere and said second sectional chamber of said pressure medium inlet chamber;

wherein said control valve device further includes an additional valve device positioned within said housing member intermediate said first sectional chamber and said second sectional chamber of said pressure medium inlet chamber to control communication of such pressure medium therebetween, said additional valve device being movable to an open position in a direction of said first sectional chamber by an effect of pressure present in said second sectional chamber;

wherein said check valve consists of a flap-like valve body positioned in said first sectional chamber in an area of a passage located in a housing wall of said control valve device;

wherein said actuating piston consists of a diaphragm secured within said housing member of said control valve device to activate said controlled inlet valve;

wherein a portion of an outer periphery of said diaphragm is secured to said housing member adjacent said passage which connects said first sectional chamber with said second sectional chamber;

wherein said valve body of said check valve, constructed like a flap, has one end attached to a portion of a mounting member for said diaphragm.

29. A control valve device, said control valve device comprising:

(a) a housing member;

(b) a pressure medium inlet chamber positioned within said housing member and connectable to a source of pressure medium through a pressure medium inlet;

(c) a pressure medium outlet chamber positioned within said housing and connectable to at least one of a consumer of such pressure medium and to atmosphere and to said pressure medium inlet chamber;

(d) an additional valve device connected before said pressure medium inlet chamber, said additional valve device being movable into an open position in a direction of said pressure medium inlet chamber by an effect of a pressure present in a pressure medium supply line communicating into said pressure medium inlet chamber; and (e) a control valve connected to at least one of a portion of said pressure medium supply line that is connected in front of said additional valve device and a device feeding into said pressure medium supply line;

wherein said additional valve device is a check valve;

wherein said check valve consists of a flap-like valve body positioned in said first sectional chamber in an area of a passage located in a housing wall of said control valve device;

wherein said actuating piston consists of a diaphragm secured within said housing member of said control valve device to activate said controlled inlet valve;

wherein a portion of an outer periphery of said diaphragm is secured to said housing member adjacent to said passage which connects said first sectional chamber with said second sectional chamber;

wherein said valve body of said check valve, constructed like a flap, has one end attached to a portion of a mounting member for said diaphragm.

30. Automatic control device, in particular for anti-skid lock devices of compressed air actuated vehicle braking systems comprising:

(a) a pressure means input chamber is furnished, which is connectable via a pressure means input to a pressure means source;

(b) a pressure means output chamber is furnished, and is connected to a user load;

(c) the pressure means output chamber is connectable via a controllable input valve to the pressure means input chamber;

(d) the pressure means output chamber is connectable to the atmosphere via an output valve;

(e) an actuation piston is furnished for actuating of the output valve;

(f) the actuation piston is subjected to the pressure in a control chamber in the closure direction of the output valve;

(g) a control chamber is selectively connectable via a control valve to the atmosphere or to the pressure means input chamber;

(h) a check valve is disposed in the pressure means input chamber, which check valve subdivides the pressure means input chamber into a first partial chamber and a second partial chamber;

(i) the second partial chamber is the input chamber for the check valve (38, 42) and the first partial chamber is the output chamber for the check valve;

(j) the first partial chamber is simultaneously the input chamber for the inlet valve;
(k) the first partial chamber and the second partial chamber are connectable to each other via the check valve;
(l) the second partial chamber is connected with the pressure means input of the automatic control valve device;
(m) the control valve is connected to the second partial chamber;
(n) the check valve can be subjected to the pressure in the second partial chamber in the open position in the direction toward the first partial chamber.

* * * * *